(12) United States Patent
Iizuka

(10) Patent No.: US 11,900,632 B2
(45) Date of Patent: Feb. 13, 2024

(54) MOVING BODY POSITION DETERMINATION DEVICE, MOVING BODY POSITION DETERMINATION METHOD, AND MOVING BODY POSITION DETERMINATION SYSTEM

(71) Applicant: CASIO COMPUTER CO., LTD., Tokyo (JP)

(72) Inventor: Nobuo Iizuka, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 330 days.

(21) Appl. No.: 17/465,191

(22) Filed: Sep. 2, 2021

(65) Prior Publication Data

US 2022/0092815 A1    Mar. 24, 2022

(30) Foreign Application Priority Data

Sep. 18, 2020 (JP) ................. 2020-157122

(51) Int. Cl.
*G06T 7/73* (2017.01)
*G06T 7/55* (2017.01)
(Continued)

(52) U.S. Cl.
CPC ................ *G06T 7/74* (2017.01); *G06T 7/248* (2017.01); *G06T 7/55* (2017.01); *B66F 9/0755* (2013.01);
(Continued)

(58) Field of Classification Search
CPC ............ H04N 5/2252; H04N 1/00411; H04N 1/00381; H04N 1/00424; H01S 5/18302;
(Continued)

(56) References Cited

U.S. PATENT DOCUMENTS

2018/0278763 A1*  9/2018  Noguchi ............ H04N 1/00424
2019/0302267 A1* 10/2019  Morita .................... G01S 17/06

FOREIGN PATENT DOCUMENTS

JP    2000-337887 A    12/2000
JP    2005-003445 A     1/2005
(Continued)

OTHER PUBLICATIONS

JPO; Application No. 2020-157122; Notice of Reasons for Refusal dated Dec. 13, 2022.

*Primary Examiner* — Phuoc H Doan
(74) *Attorney, Agent, or Firm* — Fitch, Even, Tabin & Flannery LLP

(57) ABSTRACT

A moving body position determination device includes a communicator, and at least one processor. The at least one processor is configured to acquire an image via the communicator, the image including at least two light-emitting devices of a plurality of light-emitting devices for which coordinate positions in three-dimensional space are known, the plurality of light-emitting devices including two light-emitting devices placed at desired positions at which heights in the three-dimensional space differ, the at least two light emitting devices being imaged by an imaging device attached to a moving body; acquire, on the basis of the acquired image, coordinate positions in the image of the at least two light-emitting devices; and determine, on the basis of the coordinate positions in the three-dimensional space and the coordinate positions in the image, at least one of a coordinate position of the moving body and an orientation the moving body is facing in the three-dimensional space.

18 Claims, 18 Drawing Sheets

(51) Int. Cl.
  *G06T 7/246*    (2017.01)
  *B66F 9/075*    (2006.01)
(52) U.S. Cl.
  CPC ............... *G06T 2207/30204* (2013.01); *G06T 2207/30244* (2013.01); *G06T 2207/30252* (2013.01)
(58) Field of Classification Search
  CPC ..... H01S 5/18305; G06F 3/0421; G06T 7/74; G06T 7/55; G06T 7/248; G06T 2207/30204
  See application file for complete search history.

(56) References Cited

FOREIGN PATENT DOCUMENTS

| | | |
|---|---|---|
| JP | 2005-315746 A | 11/2005 |
| JP | 2006-209770 A | 8/2006 |
| JP | 2011-134058 A | 7/2011 |
| JP | 2014-157051 A | 8/2014 |

\* cited by examiner

*FIG. 4*

MARKER THREE-DIMENSIONAL POSITION TABLE

| ID | X | Y | Z |
|---|---|---|---|
| 1001 | 15.0 | 7.5 | 5.0 |
| 1002 | 8.2 | 10.2 | 8.2 |
| 1003 | 2.1 | 5.0 | 8.2 |

FIG. 5

CAMERA INTERNAL PARAMETERS

| IMAGE DISTORTION CORRECTION DATA | CAMERA HEIGHT (Z) | CAMERA ORIENTATION MATRIX $Rz(\theta)$ (3 × 3 MATRIX EXPRESSING ROTATION WITH Z-AXIS AS ROTATIONAL AXIS) | CAMERA PLACEMENT MATRIX $Rc$ (3 × 3 MATRIX EXPRESSING ROTATION WITH X-AXIS AND Y-AXIS AS ROTATIONAL AXES) |
|---|---|---|---|

MOVING BODY POSITION DETERMINATION DEVICE, MOVING BODY POSITION DETERMINATION METHOD, AND MOVING BODY POSITION DETERMINATION SYSTEM

CROSS-REFERENCE TO RELATED APPLICATION

This application claims the benefit of Japanese Patent Application No. 2020-157122, filed on Sep. 18, 2020, the entire disclosure of which is incorporated by reference herein.

FIELD

This application relates generally to a moving body position determination device, a moving body position determination method, and a moving body position determination system.

BACKGROUND

In the related art, technology exists in which an imaging device attached to a moving body images markers, that are light-emitting devices in space, and the position and orientation in three-dimensional space of the moving body is calculated on the basis of an image obtained by that imaging (for example, Japanese Unexamined Patent Application Publication No. 2014-157051).

SUMMARY

However, with the technology described above, there is a limitation in that the markers must be arranged on the same plane. Thus, the degree of freedom of the placement of the markers is low and, also, the degree of freedom related to calculating position and orientation is low.

One advantage of the invention of the present application is that the degree of freedom related to calculating position and orientation is improved.

A moving body position determination device of the present disclosure executes processing for:

acquiring, based on an image including at least two light-emitting devices of a plurality of light-emitting devices for which coordinate positions in three-dimensional space are known, coordinate positions in the image of the at least two light-emitting devices, the plurality of light-emitting devices including two light-emitting devices placed at desired positions at which a height in the three-dimensional space differs, the image being imaged by an imaging device attached to a moving body; and determining, based on the coordinate positions in the three-dimensional space and the coordinate positions in the image, at least one of a coordinate position of the moving body and an orientation the moving body is facing in the three-dimensional space.

BRIEF DESCRIPTION OF THE DRAWINGS

A more complete understanding of this application can be obtained when the following detailed description is considered in conjunction with the following drawings, in which:

FIG. 4 is a drawing illustrating an example of a marker three-dimensional position table;

FIG. 5 is a drawing illustrating an example of camera internal parameters;

DETAILED DESCRIPTION

Hereinafter, a visible light communication system, as the moving body position determination device according to an embodiment of the present disclosure, is described while referencing the drawings.

Figure 1:
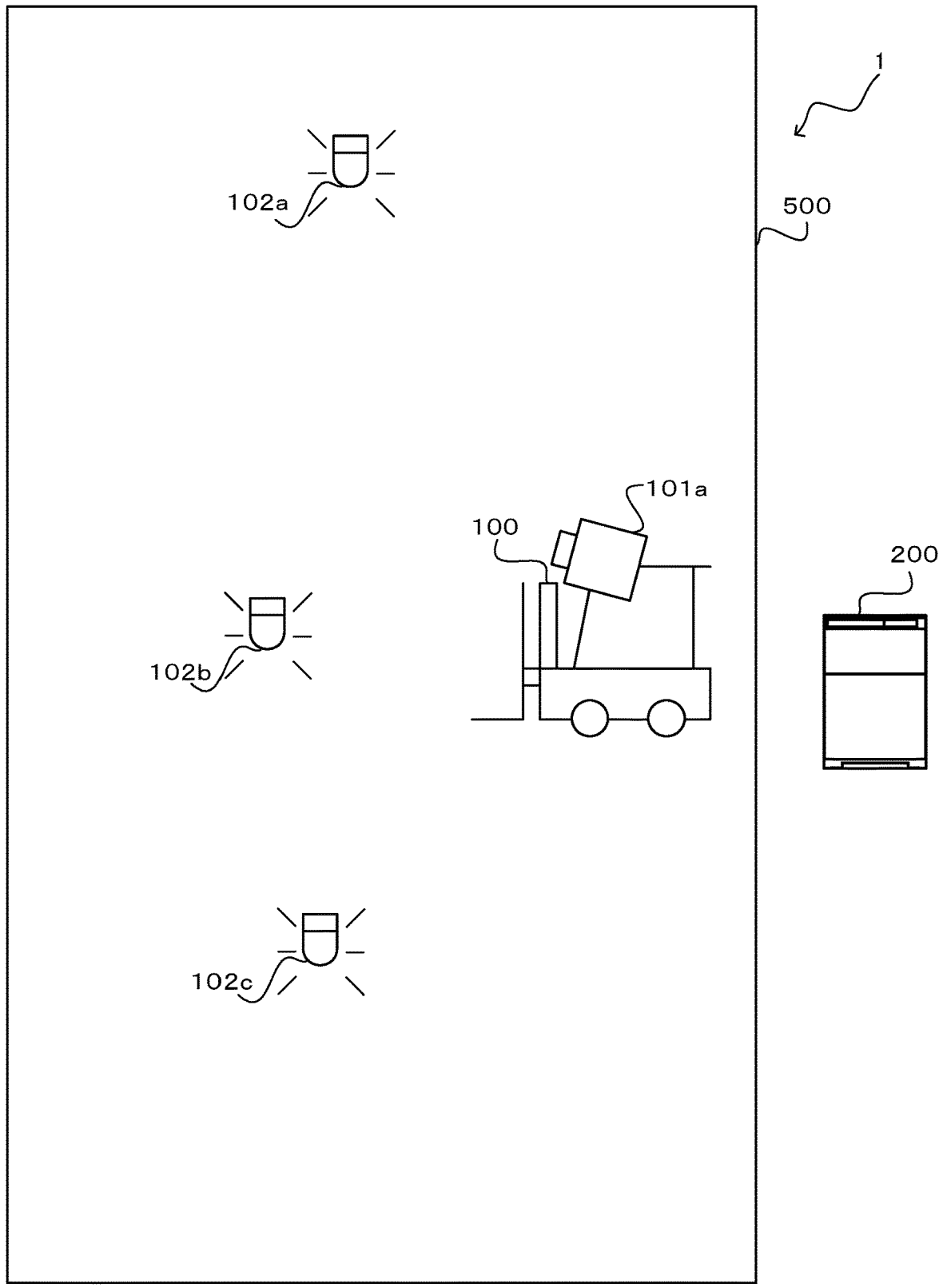
FIG. 1 is a drawing illustrating an example of a visible light communication system according to an embodiment of the present disclosure.

FIG. 1 is a drawing illustrating the configuration of a visible light communication system 1. As illustrated in FIG. 1, the visible light communication system 1 includes a forklift 100 as a moving body that moves within a space 500, a camera 101a attached to the forklift 100, markers 102a, 102b, and 102c that are light sources attached to the ceiling, side surfaces, or the like of the space 500 (hereinafter appropriately referred to as "markers 102" when not referring specifically to the marker 102a, the marker 102b, or the marker 102c), and a server 200 that corresponds to a moving body position determination device. The markers 102 include non-illustrated light emitting diodes (LED). The space 500 can be defined by three-dimensional parameters consisting of an X-axis coordinate (X coordinate), a Y-axis coordinate (Y coordinate), and a Z-axis coordinate (Z coordinate) and, due to this configuration, positions of objects that exist in the space 500 can be identified. In this case, both the X-axis and the Y-axis are horizontal axes and are orthogonal to each other, and the Z-axis is a vertical axis and is orthogonal to the X-axis and the Y-axis.

In the present embodiment, the camera 101a that is attached to the forklift 100 images the markers 102. The three-dimensional positions of the markers 102 in the space 500 are known. The markers 102 perform color modulation on the basis of various types of information to be sent, and send that information by chronologically changing the light emission color and emitting. Note that a modulation method is used in which the information to be sent is converted to bit data, and this data is assigned in the order of the three primary colors (red (R), green (G), blue (B)) of light with a predetermined regularity.

The server 200 demodulates the changes of the light emission colors in light images to acquire the information emitted by the markers 102, and calculates the three-dimensional position of the camera 101a in the space 500 as the three-dimensional position of the forklift 100. Here, the light images are obtained by the camera 101a performing chronological continuous imaging.

Figure 2:
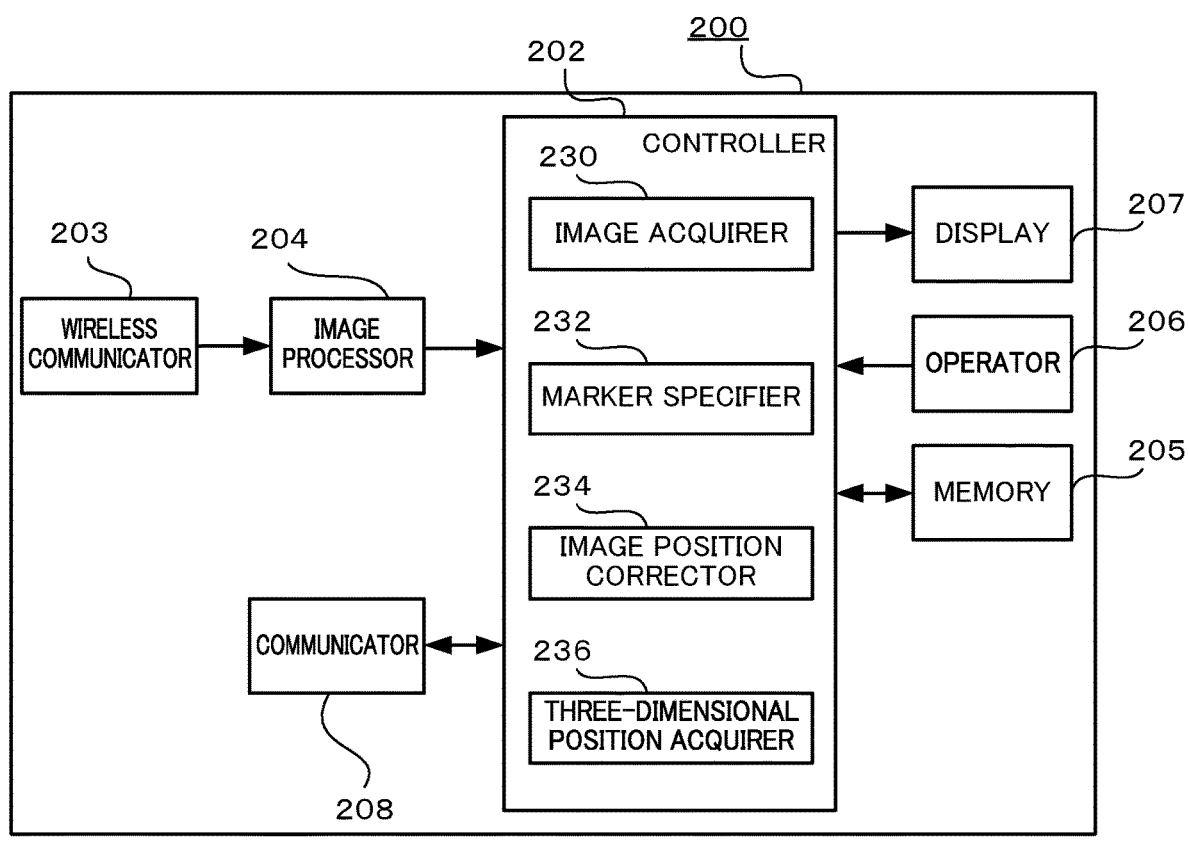
FIG. 2 is a drawing illustrating an example of the configuration of a server.

FIG. 2 is a drawing illustrating an example of the configuration of the server 200. As illustrated in FIG. 2, the server 200 includes a controller 202, a wireless communicator 203, an image processor 204, a memory 205, an operator 206, a display 207, and a communicator 208.

Figure 3:
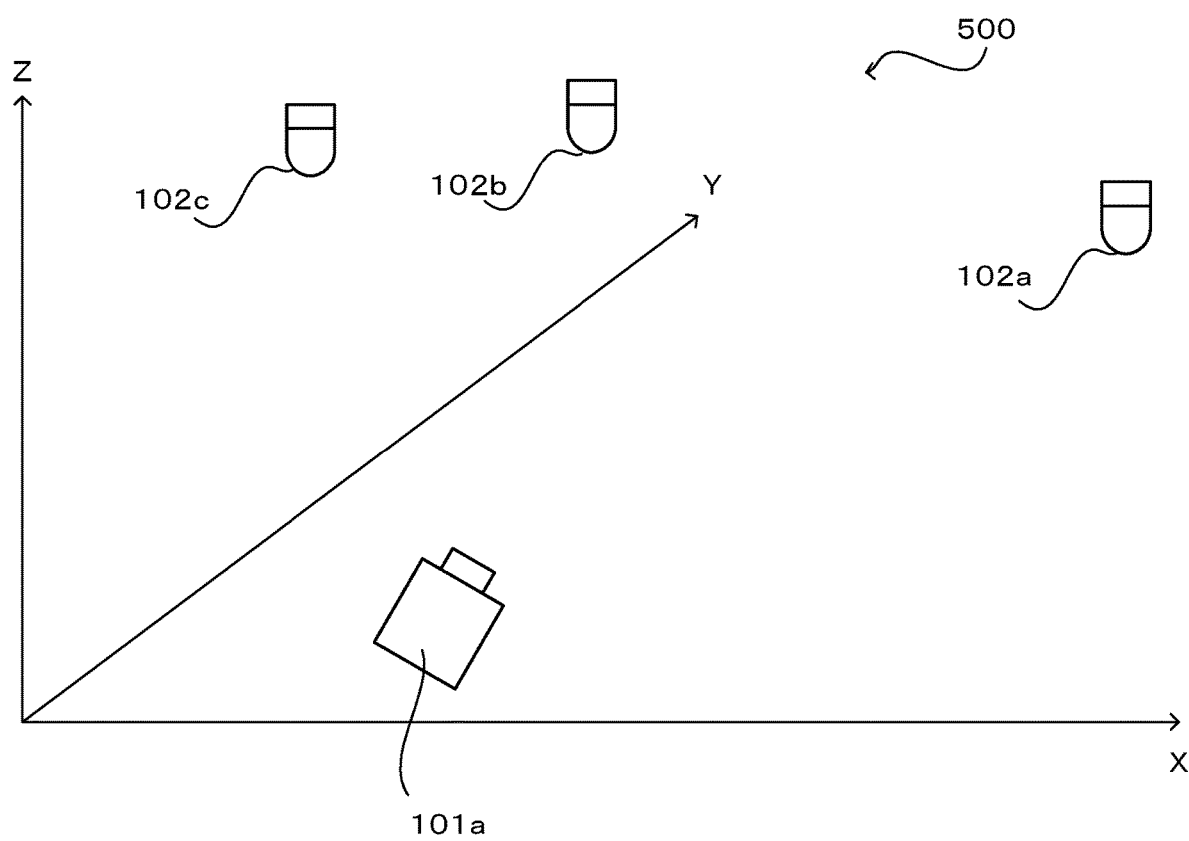
FIG. 3 is a drawing illustrating an example of the arrangement of a camera and markers in space.

FIG. 3 is a drawing illustrating an example of the arrangement of the camera 101a and the markers 102 in the space 500. In the present embodiment, the server 200 calculates the unknown three-dimensional position of the camera 101a on the basis of the known three-dimensional positions of the markers 102 in the space 500.

The camera 101a captures (receives) optical images that are input through a non-illustrated lens, and converts image signals within the imaging angle of view of the camera 101a to digital data to generate images. The camera 101a chronologically continuously performs the imaging and generating of the images, and sends the continuous images to the server 200 via wireless communication. The wireless communicator 203 in the server 200 receives the images and outputs the received images to the image processor 204. The position of each pixel and image region in the images is defined by a two-dimensional coordinate plane consisting of an X coordinate and a Y coordinate.

The following description references FIG. 2. The image processor 204 outputs, to the controller 202 without modification, the images (digital data) output from the wireless communicator 203. The image processor 204 also adjusts the image quality and the image size of the images to display the images on the display 207, and outputs the adjusted images to the controller 202. The image processor 204 has a function for encoding, converting to a still image file, and/or converting to a video file by a compression encoding method such as joint photographic experts group (JPEG) or moving photographic experts group (MPEG).

The controller 202 is implemented as at least one processor and, in one example, is configured from a central processing unit (CPU). The controller 202 executes software processing in accordance with a program (for example, a program (described later) for realizing the operations of the server 200 illustrated in FIGS. 12, 13, and 14) stored in the memory 205 to control the various functions of the server 200.

In one example, the memory 205 is implemented as random access memory (RAM) and/or read-only memory (ROM). The memory 205 stores various types of information (programs and the like) used in the control of the server 200 and the like.

Additionally, the memory 205 stores the marker three-dimensional position table illustrated in FIG. 4 and the camera internal parameters illustrated in FIG. 5. In the marker three-dimensional position table illustrated in FIG. 4, an identification (ID) capable of uniquely identifying each of the markers 102a, 102b, and 102c, and the three-dimensional positions (the X coordinate, the Y coordinate, and the Z coordinate) of the markers 102a, 102b, and 102c in the space 500 are associated with each other.

The camera internal parameters illustrated in FIG. 5 include image distortion correction data to be used when correcting distortion of the image, the height (Z coordinate) of the camera 101a, a camera orientation matrix Rz (θ) that is a 3×3 matrix expressing rotation of the camera 101a with the Z-axis as the rotational axis as attitude data expressing the direction the camera 101a is facing, and a camera placement matrix Rc that is a 3×3 matrix expressing rotation of the camera 101a with the X-axis as the rotational axis and rotation of the camera 101a with the Y-axis as the rotational axis as attitude data expressing the direction the camera 101a is facing.

The following description references FIG. 2. The operator 206 is constituted by a numeric keypad, function keys, or the like, and is an interface that is used to input the operation content of a user. In one example, the display 207 is constituted by a liquid crystal display (LCD), a plasma display panel (PDP), an electroluminescence (EL) display, or the like. The display 207 displays images in accordance with image signals output from the controller 202. In one example, the communicator 208 is implemented as a local area network (LAN) card. The communicator 208 carries out communication with an external communication device.

The controller 202 is provided with various functions such as an image acquirer 230, a marker specifier 232, an image position corrector 234, and a three-dimensional position acquirer 236.

The image acquirer 230 acquires an image from the image processor 204. The marker specifier 232 detects the positions (image position: X coordinate and Y coordinate on a two-dimensional plane corresponding to the image) of the markers 102 in the image. In this case, the markers 102a, 102b, and 102c in the space 500 emit light that cyclically changes in a three color, namely red (R), green (G), and blue (B), pattern. Here, the color pattern is modulated for each ID that is capable of uniquely identifying each of the markers 102a, 102b, and 102c.

The marker specifier 232 detects the light of the cyclic three-color patterns included in the various images obtained by the imaging of the camera 101a. Furthermore, the marker specifier 232 attempts to detect IDs that correspond to the three-color emission patterns, and also attempts to demodulate the patterns to IDs. When an ID is detected, the marker specifier 232 acquires the image position of the marker 102 in the image that corresponds to that ID.

Furthermore, the marker specifier 232 references the marker three-dimensional position table stored in the memory 205 to acquire the three-dimensional position of the marker 102 in the space 500 that corresponds to the acquired ID.

Figure 6A:
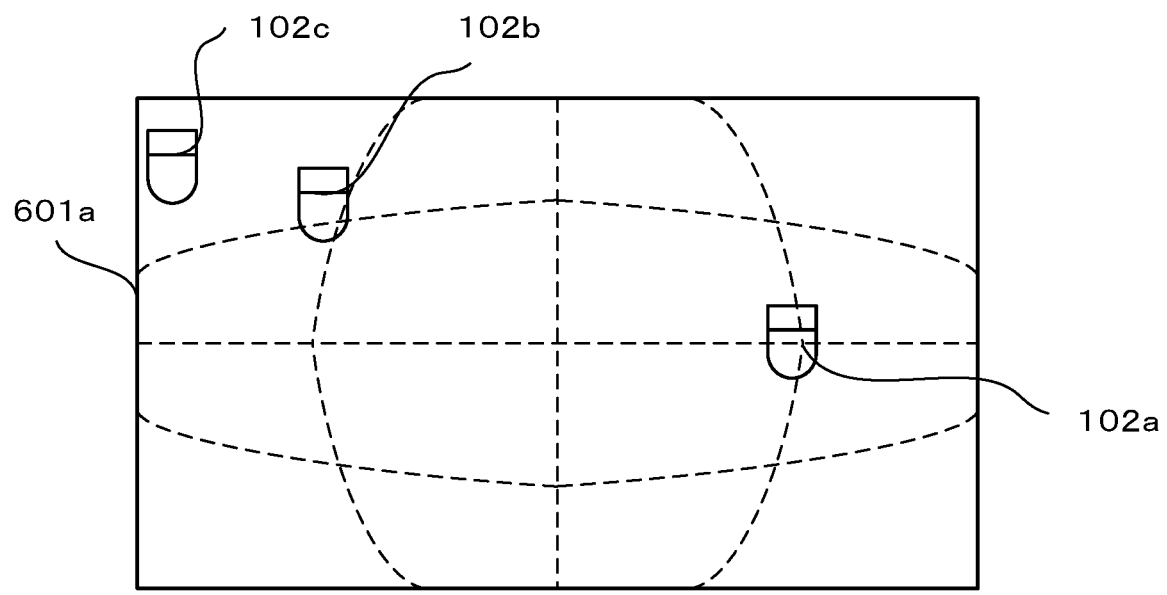
FIG. 6A is a drawing illustrating an example of an image before distortion correction.
Figure 6B:
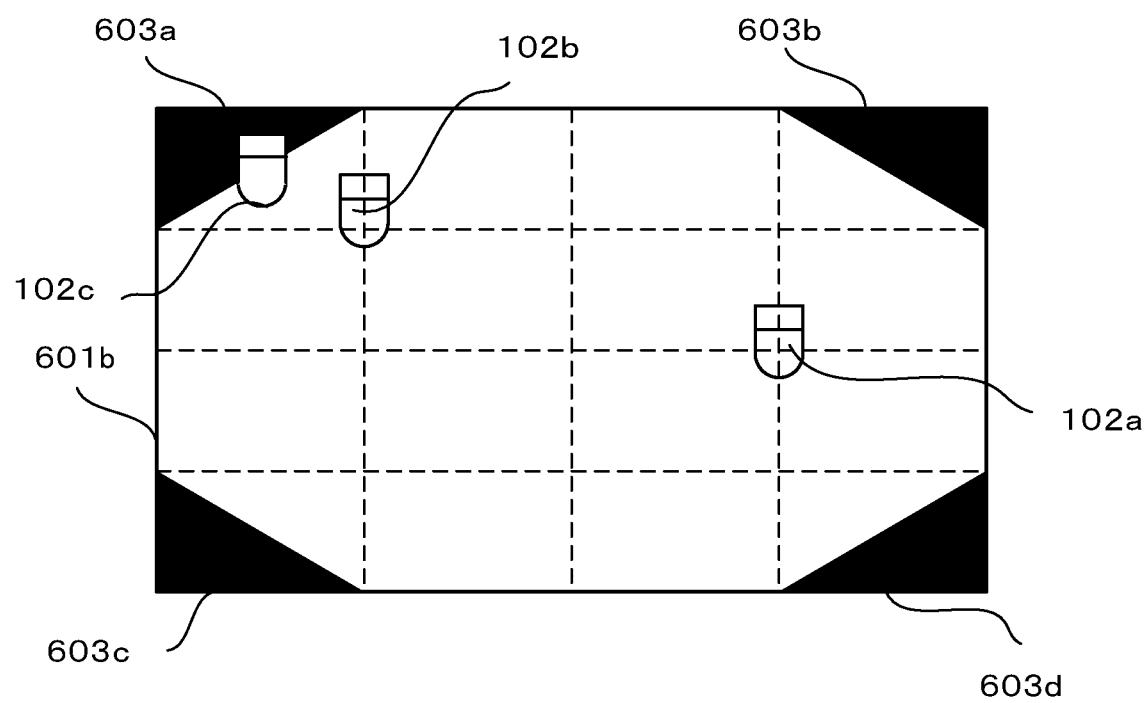
FIG. 6B is a drawing illustrating an example of an image after distortion correction.

The image position corrector 234 corrects the image positions of the markers 102. Specifically, as illustrated in FIG. 6A, distortion occurs in a normal image 601a, and that distortion increases as distance from the center of the image increases. As such, the image position corrector 234 uses the image distortion correction data of the camera internal parameters of FIG. 5 to correct the distortion. The image distortion correction data is data in which the amount of correction increases as the distance from the center of the image increases. Due to this, an image 601b in which the distortion is corrected is obtained as illustrated in FIG. 6B, and the positions (image positions) of the markers 102a, 102b, and 102c in that image 601b are corrected.

Additionally, the image position corrector 234 performs settings so that markers 102 located in the four corners in the distortion-corrected image are not used to acquire the three-dimensional position of the camera 101a. For example, as illustrated in FIG. 6A, triangular disabled regions 603a, 603b, 603c, and 603d are respectively set in the four corners of the image 601b. The marker 102c is located in the disabled region 603a and, as such, the marker 102c is not used to acquire the three-dimensional position of the camera 101a, and only the markers 102a and 102b are used to acquire the three-dimensional position of the camera 101a.

Figure 7:
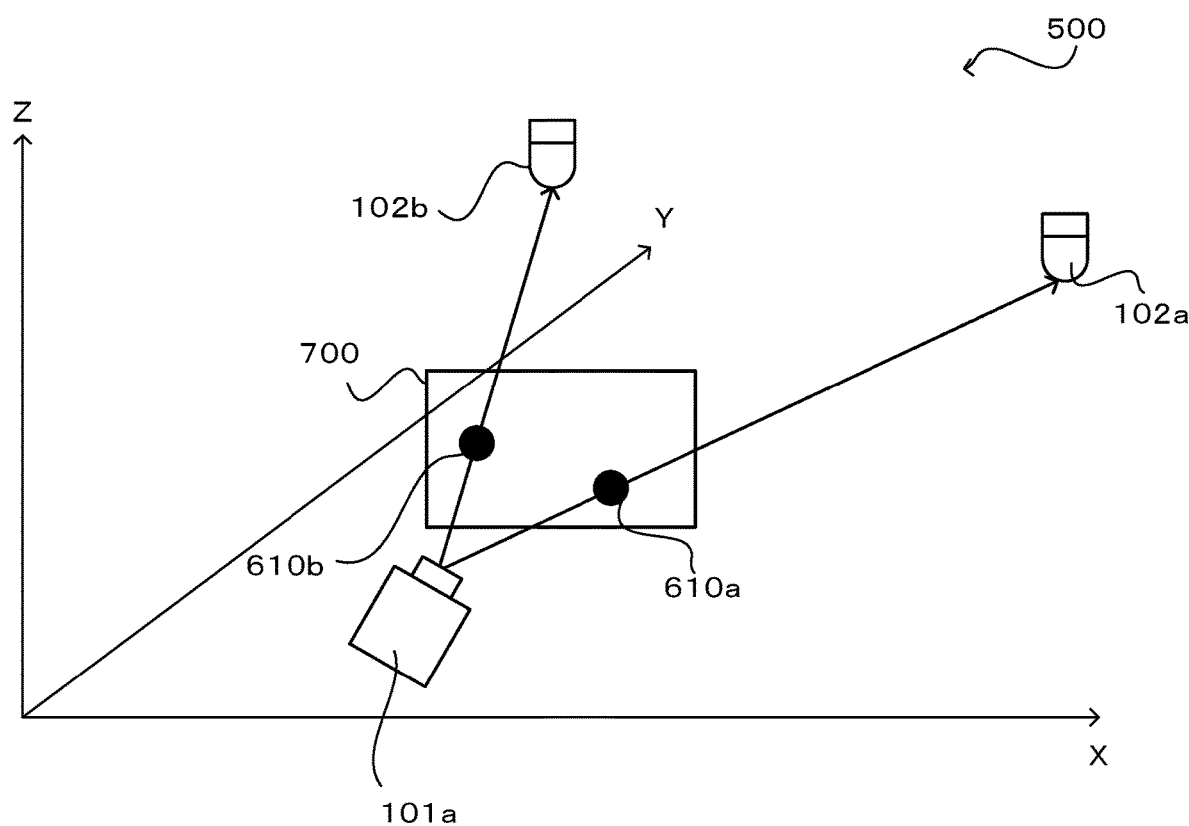
FIG. 7 is a drawing illustrating an example of image positions and three-dimensional positions of the markers.

The three-dimensional position acquirer 236 acquires the three-dimensional position of the camera 101a in the space 500. Specifically, the three-dimensional position acquirer 236 uses a known method to calculate the three-dimensional position C=(cx, cy, cz) of the camera 101a in the space 500. Here, the known method uses the image position 610a of the marker 102a and the image position 610b of the marker 102b in the image region 700 illustrated in FIG. 7, the three-dimensional position of the marker 102a and the three-dimensional position of the marker 102b obtained by referencing the marker three-dimensional position table, and the camera orientation matrix Rz (θ) and the camera placement matrix Rc that express the attitude data and that are stored in the memory 205.

Specifically, the three-dimensional position acquirer 236 calculates, on the basis of the three-dimensional position of the marker 102a, the camera internal parameters, and the attitude data, a three-dimensional direction vector (vx1, vy1, vz1) from the camera 101a toward the marker 102a, and also calculates, on the basis of the image position and the attitude data of the marker 102a, a three-dimensional direction vector (vx2, vy2, vz2) from the camera 101b toward the marker 102b. Note that these vectors are calculated in a camera-reference relative system that is a coordinate system in three-dimensional space with the camera 101a at the center.

Figure 8:
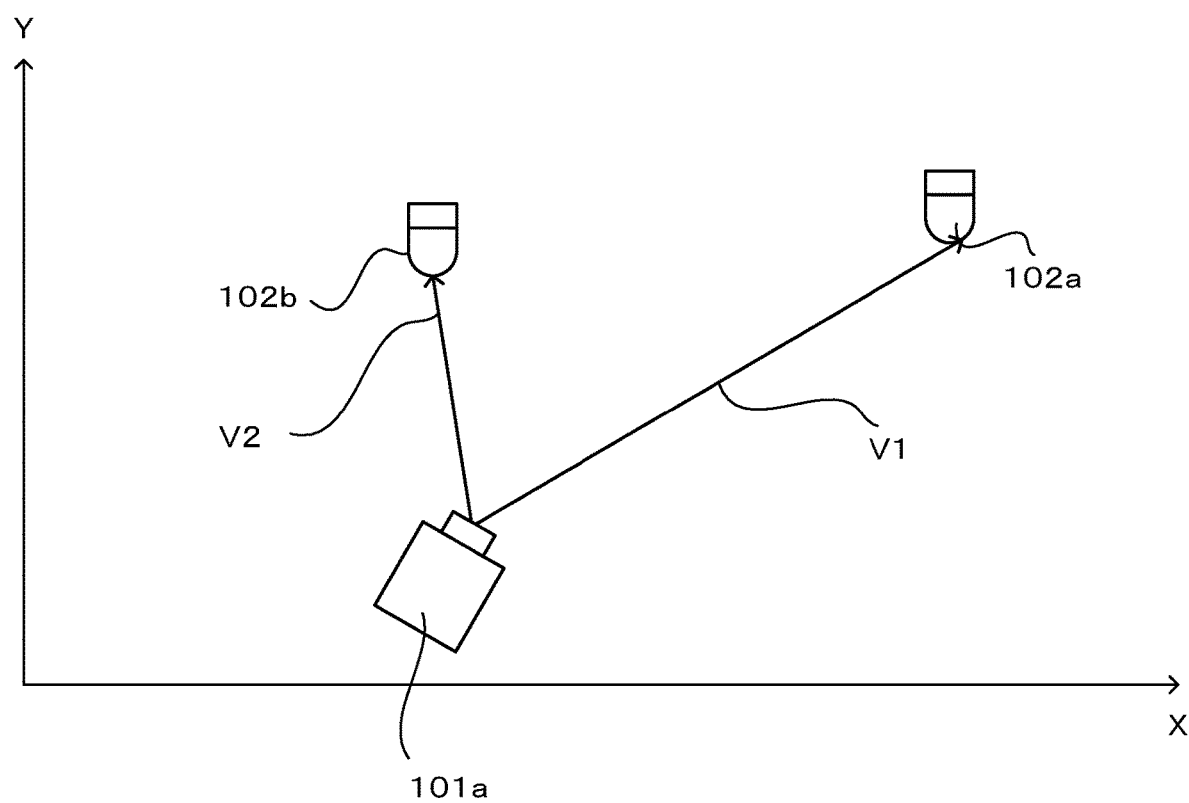
FIG. 8 is a drawing illustrating an example of XY-plane vectors.

Next, in order to adapt the three-dimensional direction vector (vx1, vy1, vz1) from the camera 101a toward the marker 102a to the positional relationship between the camera 101a and the marker 102a in the three-dimensional space, the three-dimensional position acquirer 236 uses a known method to calculate, on the basis of a camera placement matrix Rc1 and a height difference between the marker 102a and the camera 101a, an XY-plane vector V1 obtained by projecting the three-dimensional direction vector (vx1, vy1, vz1) on the XY-plane. Likewise, in order to adapt the three-dimensional direction vector (vx2, vy2, vz2) from the camera 101a toward the marker 102b to the positional relationship between the camera 101a and the marker 102b in the three-dimensional space, the three-dimensional position acquirer 236 calculates, on the basis of a camera placement matrix Rc2 and a height difference between the marker 102b and the camera 101a, an XY-plane vector V2 obtained by projecting the three-dimensional direction vector (vx2, vy2, vz2) on the XY-plane. FIG. 8 is a drawing illustrating an example of the XY-plane vectors V1 and V2.

Furthermore, the three-dimensional position acquirer 236 adjusts the XY-plane vector V1 and the XY-plane vector V2. This adjustment is for reducing error in a case in which error occurs in the calculated three-dimensional position C=(cx, cy, cz) of the camera 101a in the space 500 due to error in the rotational angle θ around the Z-axis expressed by the camera orientation matrix Rz(θ) or the like.

Figure 9A:
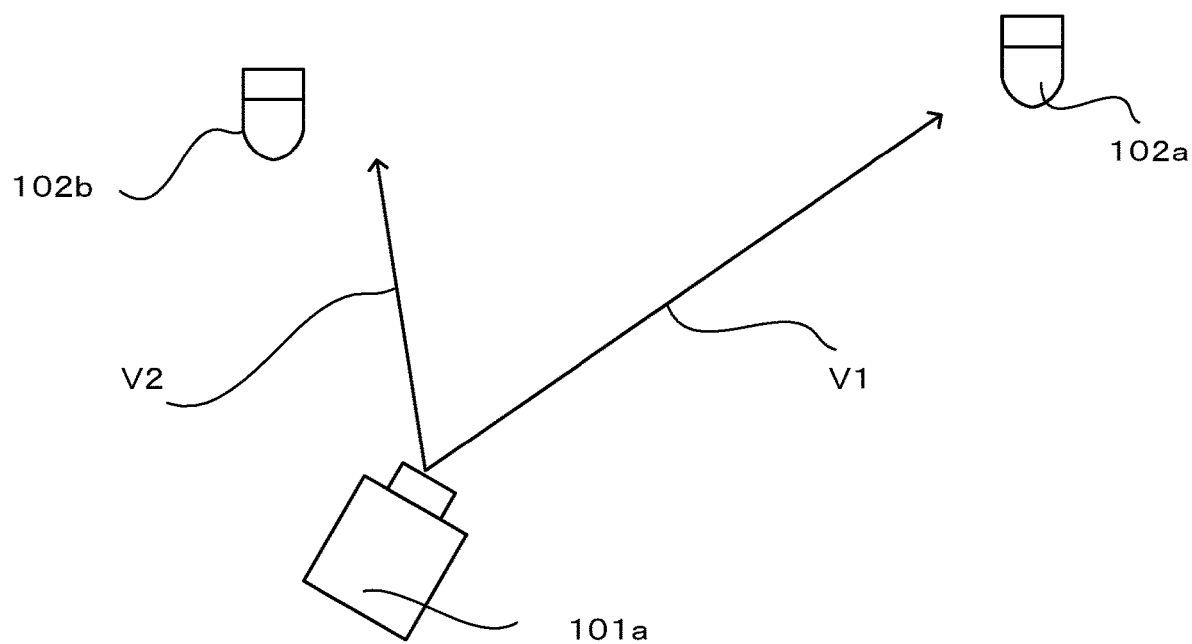
FIG. 9A is a drawing illustrating an example of unadjusted XY-plane vectors.

For example, as illustrated in FIG. 9A, when, on the XY-plane, the positional relationships between the camera 101a and the markers 102a and 102b do not match the XY-plane vector V1 and the XY-plane vector V2, the three-dimensional position acquirer 236 adjusts the XY-plane vector V1 and the XY-plane vector V2.

For example, the three-dimensional position acquirer 236 adjusts the rotational angle θ around the Z-axis expressed by the camera orientation matrix Rz(θ) to attempt to make the positional relationships between the camera 101a and the markers 102a and 102b match the XY-plane vector V1 and the XY-plane vector V2.

Figure 9B:
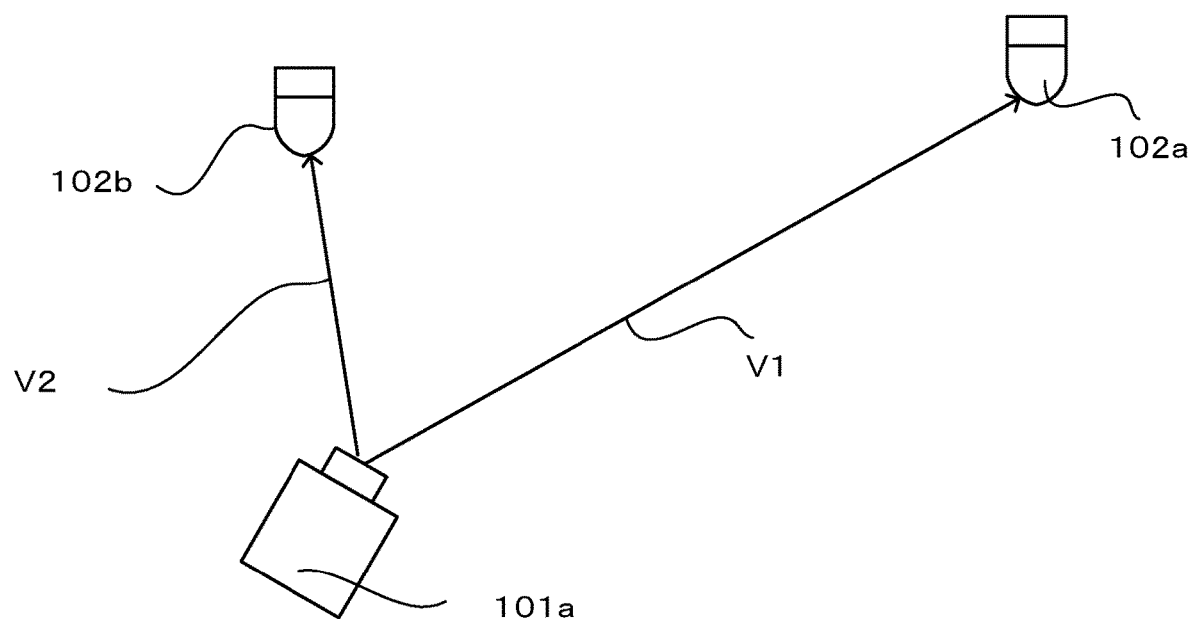
FIG. 9B is a drawing illustrating an example of adjusted XY-plane vectors.

In FIG. 9A, since the XY-plane vector V1 is longer than the XY-plane vector V2, the three-dimensional position acquirer 236 regards the XY-plane vector V1 as having a large error and, as illustrated in FIG. 9B, makes the positional relationship between the camera 101a and the marker 102b match the XY-plane vector V2 without adjusting the length and the direction of the XY-plane vector V2, and adjusts the length and the direction of the XY-plane vector V2 to make the positional relationship between the camera 101a and the marker 102b match the XY-plane vector V2.

Figure 9C:
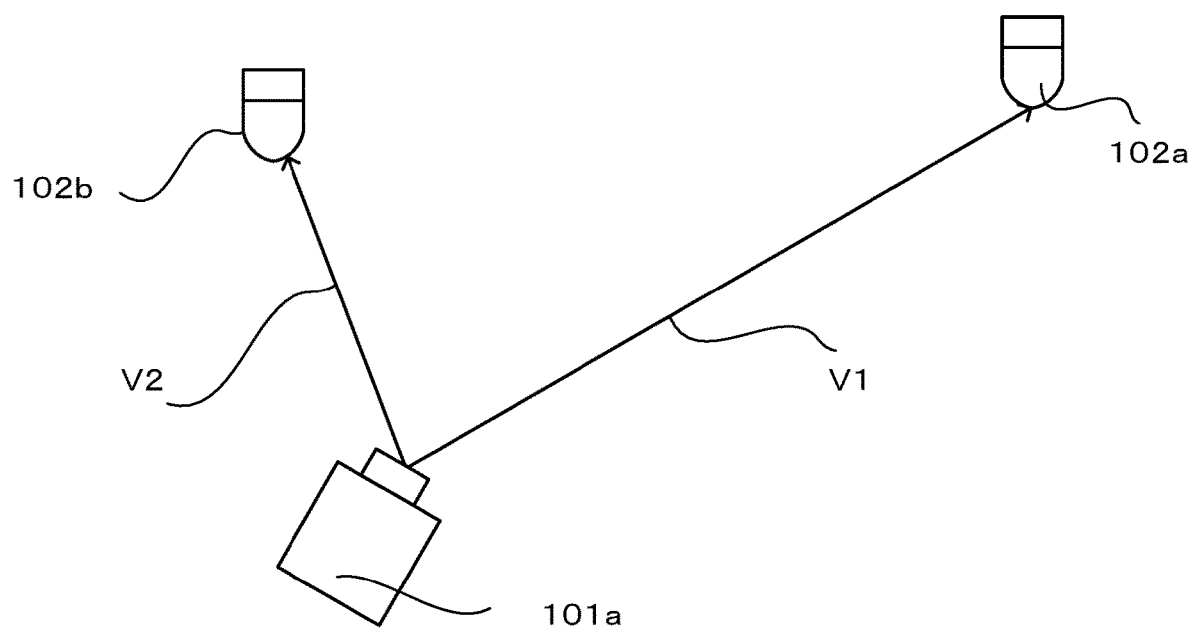
FIG. 9C is a drawing illustrating an example of adjusted XY-plane vectors.

As illustrated in FIG. 9C, the three-dimensional position acquirer 236 makes a ratio of an amount of deviation of a distance between the three-dimensional position of the marker 102a and the coordinate position of the ending point of the XY-plane vector V1 to the amount of deviation of a distance between the three-dimensional position of the marker 102a and the coordinate position of the ending point of the XY-plane vector V2 match the ratio of the lengths of the XY-plane vector V1 and the XY-plane vector V2, and adjusts the length and the direction of both the XY-plane vector V1 and the XY-plane vector V2 to make the positional relationship between the camera 101a and the marker 102b match the XY-plane vector V2.

The three-dimensional position acquirer 236 uses the adjusted XY-plane vectors V1 and V2 and the camera orientation matrix Rz(θ) to calculate the three-dimensional direction vector (vx1, vy1, vz1) and, also, the three-dimensional position C=(cx, cy, cz) of the camera 101a in the space 500. Additionally, the three-dimensional position acquirer 236 calculates the orientation of the camera 101a on the basis of the camera orientation matrix Rz(θ) and the camera placement matrix Rc.

Furthermore, the three-dimensional position acquirer 236 selects the best three-dimensional position C=(cx, cy, cz) from among the three-dimensional positions C=(cx, cy, cz) of the camera 101a stored in the memory 205, and sets the selected three-dimensional position C as the final three-dimensional position of the camera 101a (coordinate position of the moving body). The "best three-dimensional position" is a position, of the various three-dimensional positions C of the camera 101a, at which corresponding reprojection error is smallest, or is a position that is calculated by weight-averaging according to the reciprocal of the reprojection error. The three-dimensional position acquirer 236 associates the calculated three-dimensional position and orientation of the camera 101a with the IDs of the markers 102 included in the image, and stores the associated information in the memory 205.

In a case in which two or more of the markers 102 are initially imaged by the camera 101a but, thereafter, only one marker 102 is imaged due to the movement of the camera 101a, the final three-dimensional position and orientation of the camera 101a are calculated on the basis of the image position of that one marker 102.

Figure 10:
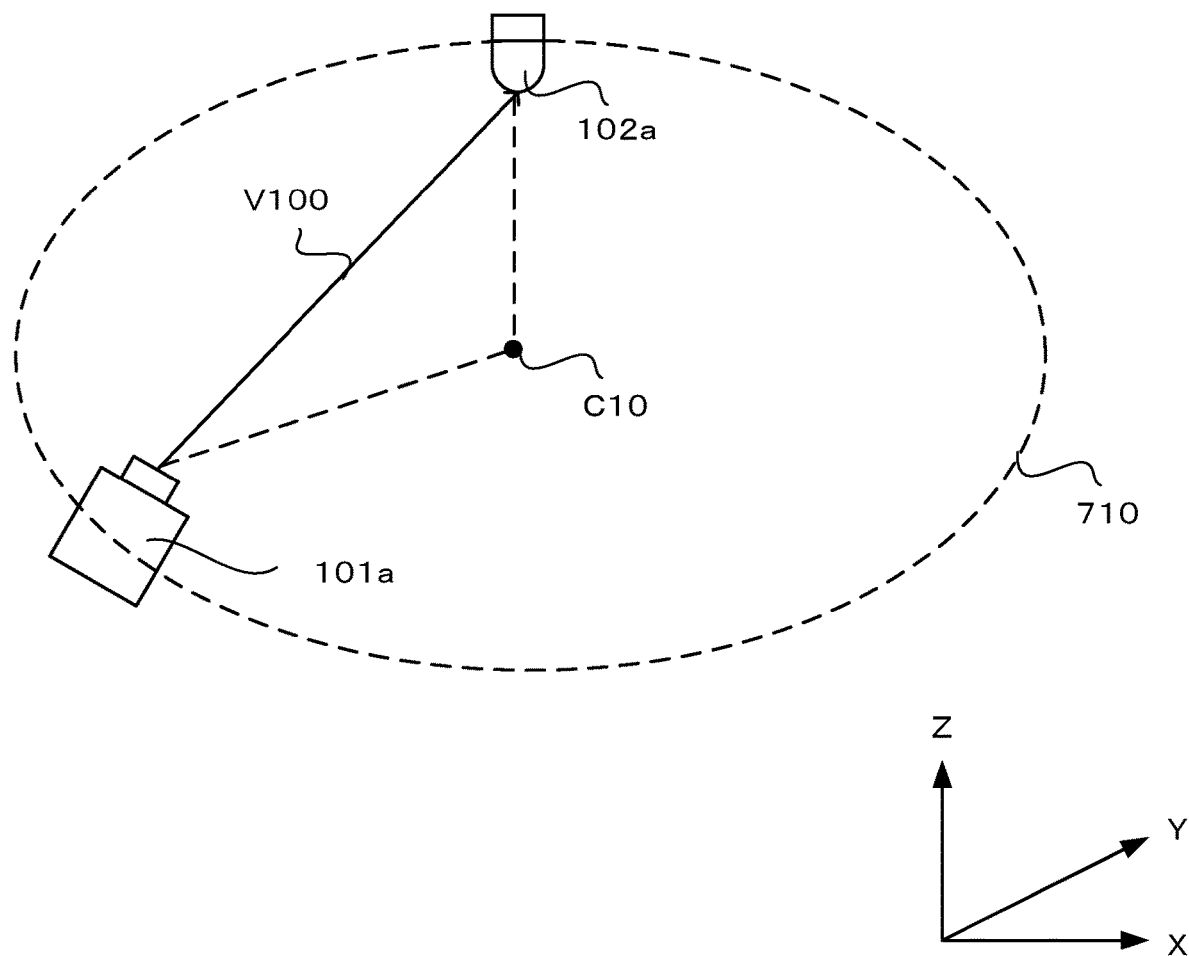
FIG. 10 is a drawing illustrating an example of a camera position candidate line.

Specifically, the three-dimensional position acquirer 236 calculates a three-dimensional direction vector from the camera 101a to the marker 102 in the camera-reference relative system that is a coordinate system of three-dimensional space with the camera 101a at the center. The three-dimensional direction vector is calculated on the basis of the attitude data and the image position of the marker 102. As illustrated in FIG. 10, when a three-dimensional direction vector V100 is calculated, the position of the camera 101a in the three-dimensional space (three-dimensional position) is any position on a camera position candidate line 710 that is the outer edge of a circle with a position C10 at the center. Here, the camera position candidate line 710 is directly under the marker 102 and is on the same plane (the XY-plane) as the camera 101a.

Furthermore, the three-dimensional position acquirer 236 calculates an inclination of the three-dimensional direction vector with respect to the XY-plane, and calculates a horizontal distance (distance on the XY-plane) between the camera 101a and the marker 102 on the basis of that inclination and the height difference between the camera 101a and the marker 102.

Figure 11:
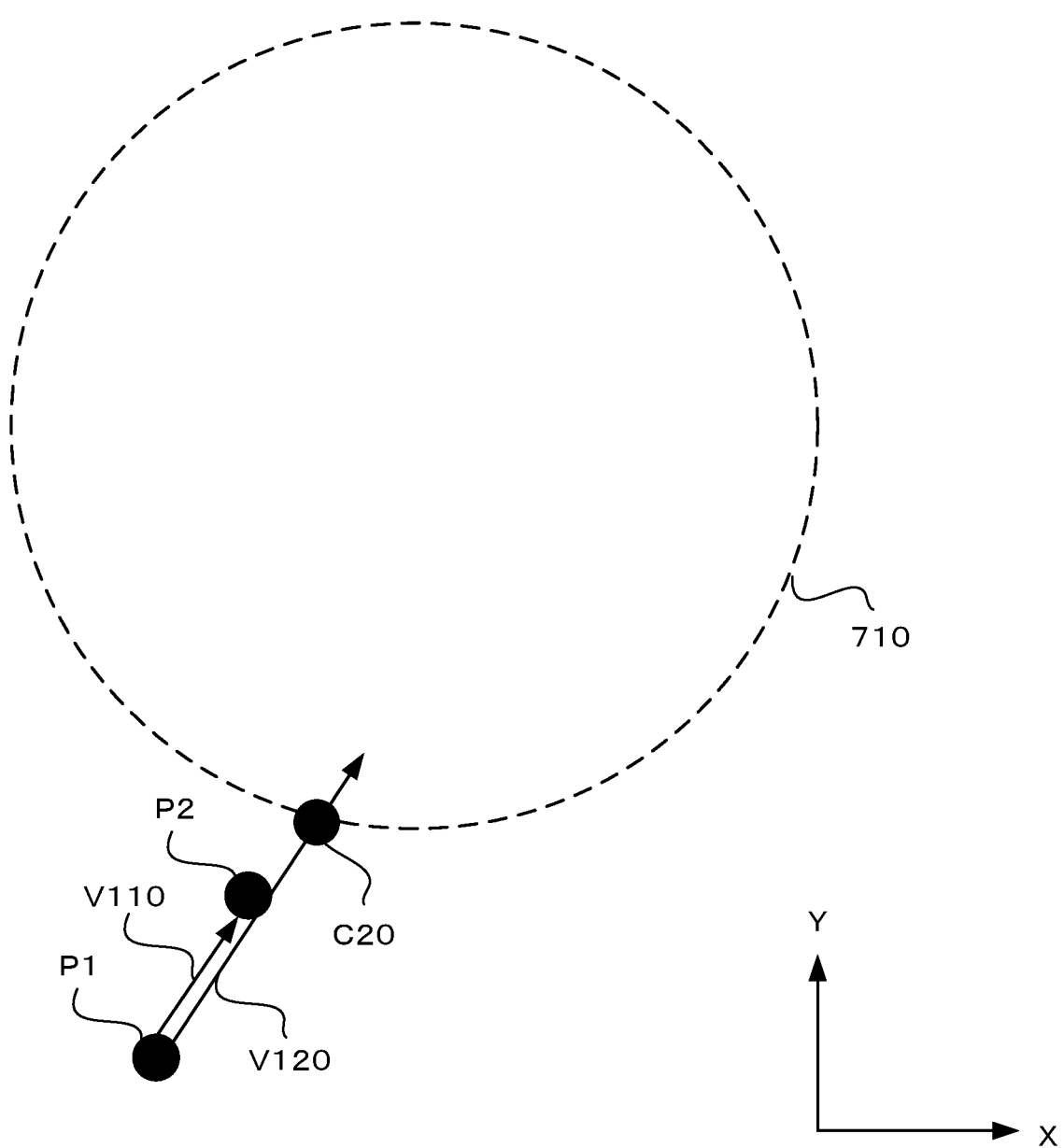
FIG. 11 is a drawing illustrating an example of acquisition of a crossing point of the camera position candidate line and an extended vector.

Next, as illustrated in FIG. 11, the three-dimensional position acquirer 236 calculates, on the basis of history, stored in the memory 205, of the three-dimensional position and orientation of the camera 101a corresponding to the ID of the marker 102, a movement vector V110. The movement vector V110 has a three-dimensional position P1 of the camera 101a as a starting point and a three-dimensional position P2 of the camera 101a as an ending point. Here, the three-dimensional position P1 is a position that is obtained from a measurement two times before (position two times before), and the three-dimensional position P2 is a position obtained from a measurement one time before (position one time before). Additionally, the three-dimensional position acquirer 236 calculates an extended vector V120 obtained by extending the movement vector V110. Furthermore, the three-dimensional position acquirer 236 sets a crossing point C20, where the extended vector V120 intersects the camera position candidate line 710, as the current three-dimensional position of the camera 101a.

Next, the three-dimensional position acquirer 236 calculates the change in the orientation of the camera 101a from the lateral movement (movement on the XY-plane) of the marker 102 in the image, adds the amount of change in orientation to the orientation from the measurement of one time before, and sets the result as the current orientation of the camera 101a. Furthermore, the three-dimensional position acquirer 236 associates the calculated three-dimensional position and orientation of the camera 101a with the ID of the marker 102 included in the image, and stores the associated information in the memory 205.

Figure 12:
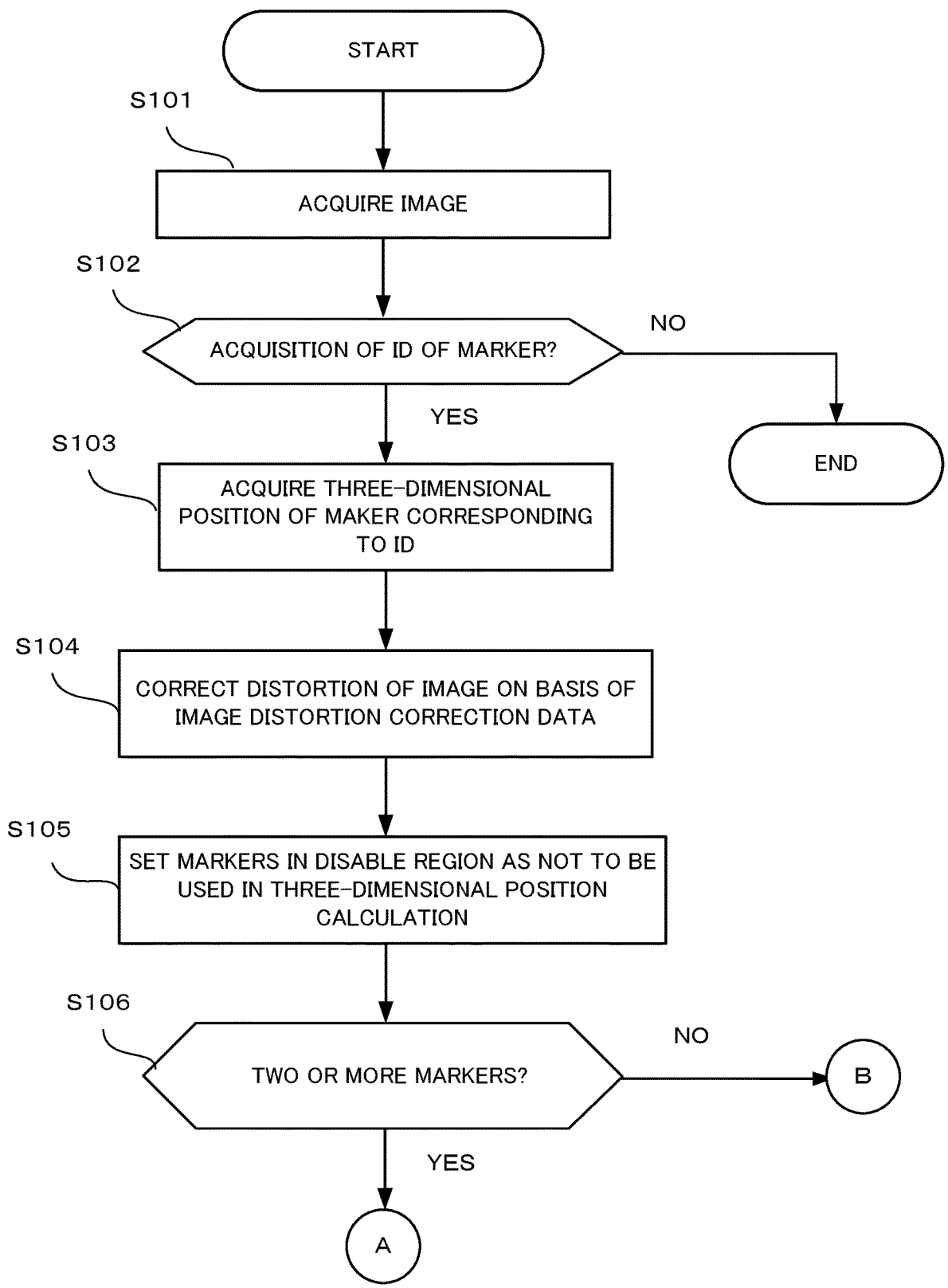
FIG. 12 is a first flowchart illustrating an example of the operations of the server.
Figure 13:
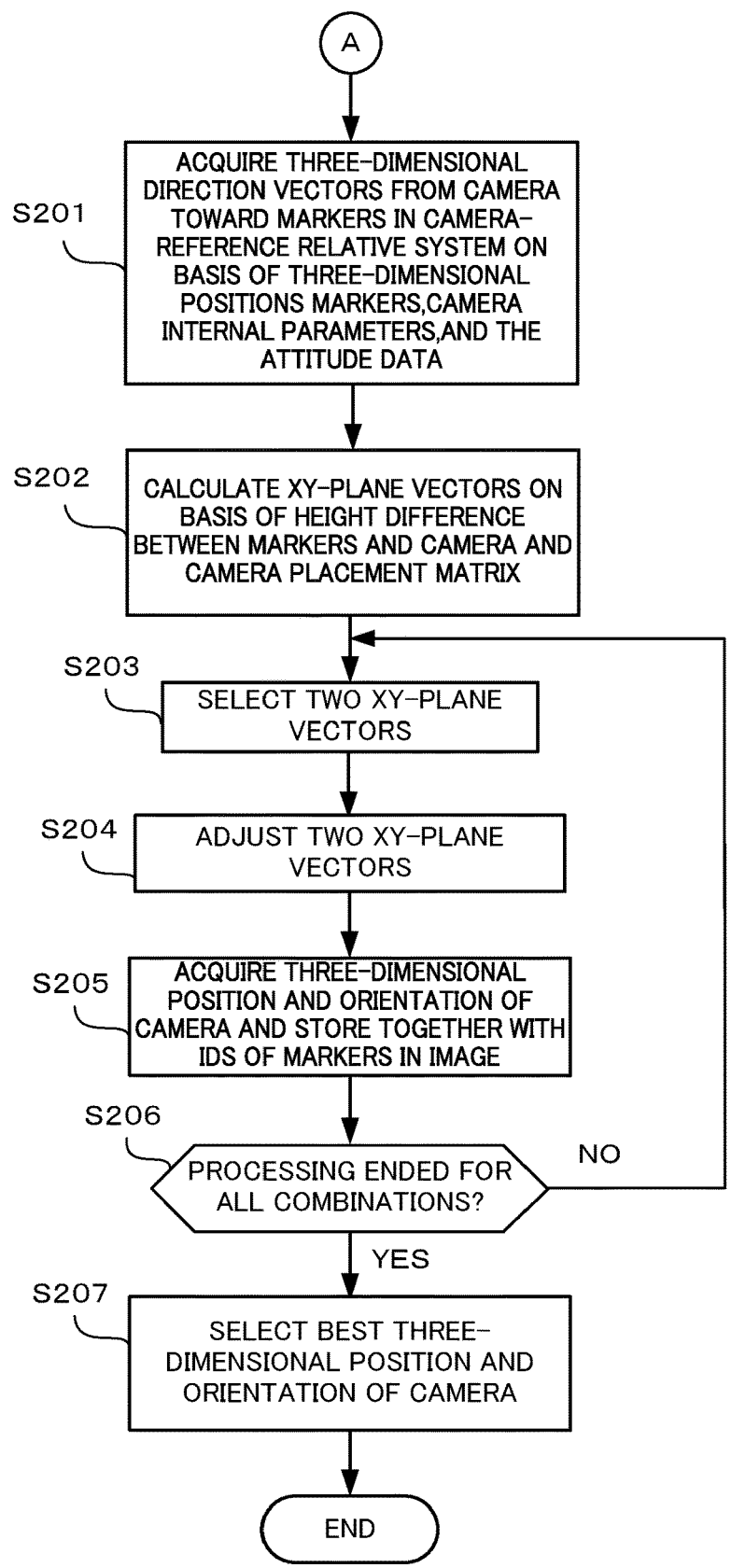
FIG. 13 is a second flowchart illustrating an example of the operations of the server.
Figure 14:
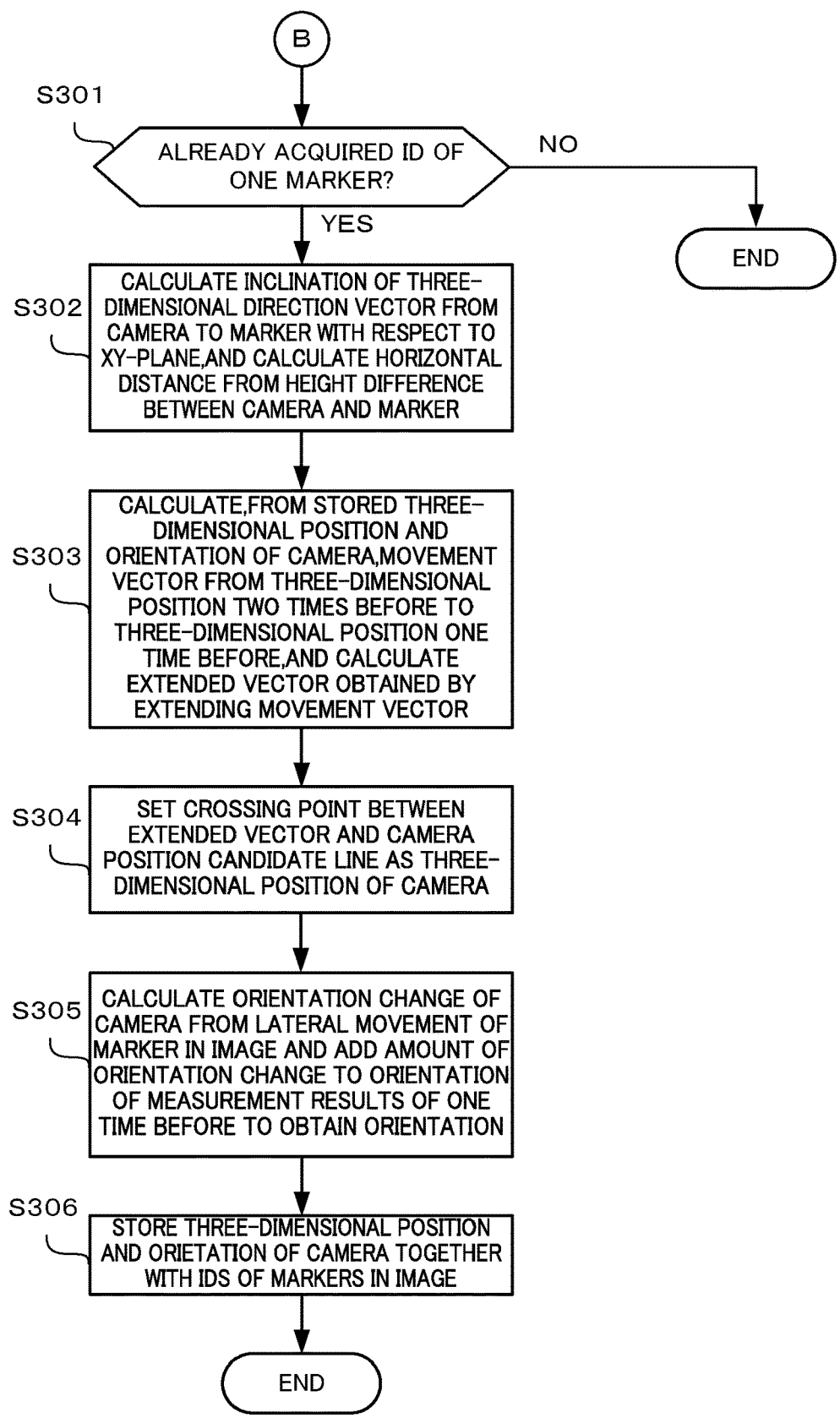
FIG. 14 is a third flowchart illustrating an example of the operations of the server.

Next, the operations of the server 200 are described while referencing flowcharts. FIGS. 12, 13, and 14 are flowcharts illustrating examples of the operations of the server 200.

The image acquirer 230 in the controller 202 acquires an image captured by the camera 101a from the image processor 204 (step S101). Next, the marker specifier 232 analyzes the image, attempts to acquire IDs of the markers 102, and determines whether IDs are acquired (step S102). When IDs are not acquired (step S102; NO), the series of operations is ended.

However, when IDs are acquired (step S102; YES), the marker specifier 232 references the marker three-dimensional position table and acquires the three-dimensional positions in the space 500 of the markers 102 corresponding to the acquired IDs (step S103).

The image position corrector 234 corrects the distortion of the image on the basis of the image distortion correction data of the camera internal parameters (step S104). Furthermore, the image position corrector 234 performs settings so that markers 102 located in the disabled region 603a and the like in the distortion-corrected image are not used to acquire the three-dimensional position of the camera 101a (step S105).

Next, the three-dimensional position acquirer 236 determines whether two or more of the markers 102 exist in the image (step S106). When two or more of the markers 102 exist in the image (step S106; YES), the operations illustrated in FIG. 13 are executed and the three-dimensional position acquirer 236 calculates three-dimensional direction vectors from the camera 101a toward the markers 102 in the camera-reference relative system on the basis of the three-dimensional position of the marker 102a, the camera internal parameters, and the attitude data (step S201).

Next, the three-dimensional position acquirer 236 calculates, on the basis of the height difference between the markers 102 and the camera 101a and the camera placement matrix Rc, XY-plane vectors obtained by projecting the three-dimensional direction vectors on the XY-plane (step S202).

Next, the three-dimensional position acquirer 236 selects two XY-plane vectors that have, as ending points, two markers 102 of the two or more markers 102 (step S203).

Next, the three-dimensional position acquirer 236 adjusts the two XY-plane vectors (step S204). Then, the three-dimensional position acquirer 236 uses the adjusted XY-plane vectors and the camera orientation matrix $Rz(\theta)$ to calculate the three-dimensional position of the camera 101a in the space 500, calculates the orientation of the camera 101a on the basis of the camera orientation matrix $Rz(\theta)$ and the camera placement matrix Rc, and stores the results in the memory 205 together with the IDs of the markers 102 in the image (step S205).

Next, the three-dimensional position acquirer 236 determines whether the processing of steps S203 to S205 is ended for all combinations of the two XY-plane vectors (step S206). When the processing is not ended, (step S206; NO), the operations are repeated from step S203. However, when the processing is ended (step S206; YES), the three-dimensional position acquirer 236 selects the best three-dimensional position and orientation of the camera 101a (step S207).

However, in step S106 of FIG. 11, when two or more of the markers 102 do not exist in the image (step S106; NO), that is, when there is only one marker 102 in the image, the operations illustrated in FIG. 14 are executed, and the three-dimensional position acquirer 236 determines whether the ID of the one marker 102 has already been acquired in a past acquisition of the three-dimensional position and orientation of the camera 101a (step S301). When the ID has not been acquired (step S301; NO), the series of operations is ended.

However, when the ID has already been acquired (step S301; YES), the three-dimensional position acquirer 236 calculates a three-dimensional direction vector from the camera 101a to the marker 102 in the camera-reference relative system that is a coordinate system of three-dimensional space with the camera 101a at the center. Furthermore, the three-dimensional position acquirer 236 calculates the inclination of the three-dimensional direction vector with respect to the XY-plane, and calculates a horizontal distance (distance on the XY-plane) between the camera 101a and the marker 102 on the basis of the inclination and the height difference between the camera 101a and the marker 102 (step S302).

Next, the three-dimensional position acquirer 236 calculates, on the basis of history, stored in the memory 205, of the three-dimensional position and orientation of the camera 101a corresponding to the ID of the marker 102, a movement vector from the three-dimensional position of the camera 101a obtained from a measurement two times before (position two times before) toward the three-dimensional position of the camera 101a obtained from measurement one time before (position one time before), and calculates an extended vector obtained by extending that movement vector (step S303).

Furthermore, the three-dimensional position acquirer 236 sets a crossing point where the extended vector intersects the camera position candidate line as the current three-dimensional position of the camera 101a (step S304).

Next, the three-dimensional position acquirer 236 calculates the change in the orientation of the camera 101a from the lateral movement of the marker 102 in the image, adds the amount of change in orientation to the orientation from the measurement of one time before, and sets the result as the current orientation of the camera 101a (step S305). Furthermore, the three-dimensional position acquirer 236 associates the calculated three-dimensional position and orientation of the camera 101a with the ID of the marker 102 included in the image, and stores the associated information in the memory 205 (step S306).

Thus, in the present embodiment, when the server 200 acquires an image obtained as a result of the camera 101a imaging the markers 102, the positions of the markers 102 are corrected by correcting the distortion of that image, and the image positions of the markers 102 in the corrected image are converted to the three-dimensional position of the camera 101a (the forklift 100). In the present embodiment, the placement positions of the markers 102 are not limited and, as such, the degree of freedom related to calculating the three-dimensional position and orientation of the forklift 100 can be improved.

In the present embodiment, considering that the distortion of the image increases as the distance from the center of the image increases, the server 200 performs image correction using the image distortion correction data in which the amount of correction increases as the distance from the center of the image increases and, also, does not use the markers 102 that exist in the disabled region 603a and the like of the four corners of the image to acquire the three-dimensional position of the camera 101a. As a result, the calculation accuracy of the three-dimensional position and orientation of the camera 101a can be improved.

In the present embodiment, the server 200 adjusts the XY-plane vectors. Therefore, when error occurs in the three-dimensional position of the camera 101a due to error in the rotational angle θ around the Z-axis expressed by the camera orientation matrix Rz(θ) or the like, the server 200 can reduce that error.

In the present embodiment, the best three-dimensional position and orientation is selected or acquired on the basis of the three-dimensional position and orientation of the camera 101a acquired for each combination of two markers 102 and, as such, the calculation accuracy of the three-dimensional position and orientation of the camera 101a can be improved.

In the present embodiment, even in a case in which there is only one marker 102 included in the image, when the three-dimensional position and orientation of the camera 101a has been calculated in the past using the three-dimensional position of that marker 102, the current three-dimensional position and orientation of the camera 101a can be calculated. As such, versatility related to calculating the three-dimensional position and orientation of the camera 101a can be improved.

In the present embodiment, each of the markers 102 has an independent ID and, also, the number of IDs in that set can be extremely large. As such, a large number of markers 102 having different IDs can be disposed across an extremely wide range. Therefore, regardless of the previous state, the absolute distance to the markers 102 in the space 500 can be calculated immediately at the point in time at which the IDs of two markers 102 are received.

The present disclosure is not limited by the foregoing descriptions of the embodiments and drawings, and various modifications and the like may be made to the embodiments and the drawings.

Figure 15:
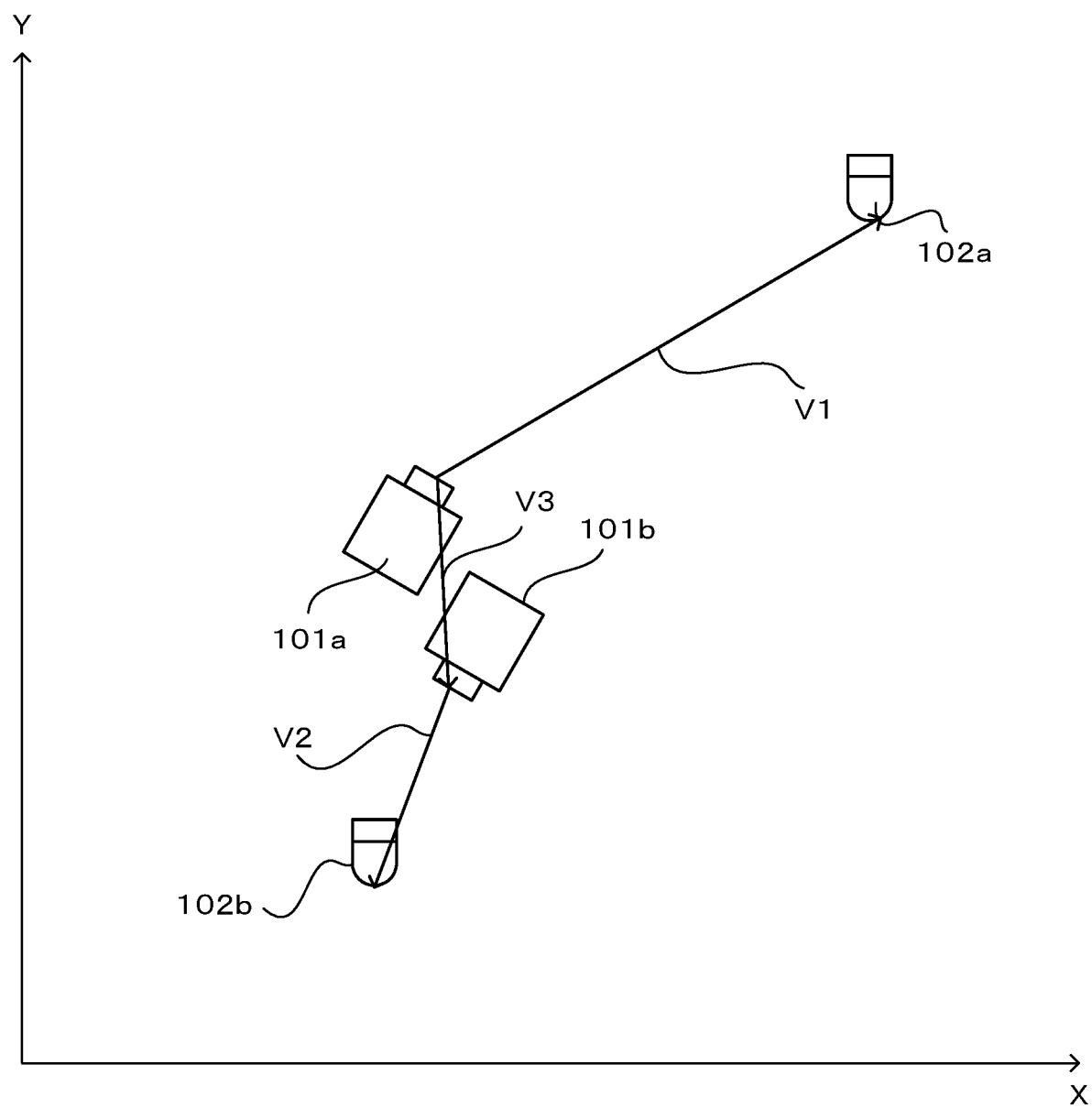
FIG. 15 is a drawing illustrating an example of XY-plane vectors when two cameras are provided.

In the embodiment described above, only the camera 101a is used. However, a configuration is possible in which a plurality of cameras is used. For example, as illustrated in FIG. 15, in a case in which a camera 101b is provided in addition to the camera 101a, the three-dimensional position of the forklift 100 can be calculated with good accuracy by the camera 101a imaging the marker 102a, the camera 101b imaging the marker 102b, and an XY-plane vector V3 on the XY-plane from the camera 101a toward the camera 101b being defined.

In the embodiment described above, the markers 102 send the IDs by chronologically changing the emission color. However, a configuration is possible in which the markers 102 send the three-dimensional positions of the markers 102. In such a case, the server 200 can detect the three-dimensional positions of the markers 102 corresponding to the emission patterns. Such a configuration eliminates the need for the marker three-dimensional position table illustrated in FIG. 4.

The markers 102 are not limited to LEDs. For example, a configuration is possible in which a light source is formed in a portion of an LCD, PDP, EL display or the like of a display device.

Provided that the server 200 is a device that acquires images from the cameras 101a and 101b, any device may be used as the server 200.

In the embodiment described above, the program to be executed may be stored and distributed on a flexible disc, a compact disc read-only memory (CD-ROM), a digital versatile disc (DVD), a magneto-optical (MO) disc, or a similar non-transitory computer-readable recording medium, and a system that executes the processing described above may be constructed by installing that program.

A configuration is possible in which the program is stored on a disc device or the like of a predetermined server on a network such as the internet, and downloaded or the like by being superimposed on a carrier wave, for example.

Note that, in cases in which the functions described above are realized in part by an operating system (OS), or the functions are realized by cooperation between an OS and an application, it is possible to store and distribute only the portion other than the OS on the medium, or download or the like only the portion other than the OS.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A moving body position determination device, comprising:
   a communicator; and
   at least one processor, wherein the at least one processor is configured to
      acquire an image via the communicator, the image including at least two light-emitting devices of a plurality of light-emitting devices for which coordinate positions in three-dimensional space are known, the plurality of light-emitting devices including two light-emitting devices placed at desired positions at which heights in the three-dimensional space differ, the image being imaged by an imaging device attached to a moving body,
      acquire, based on the acquired image, coordinate positions in the image of the at least two light-emitting devices, and
      determine, based on the coordinate positions in the three-dimensional space and the coordinate positions in the image, at least one of a coordinate position of the moving body and an orientation the moving body is facing in the three-dimensional space.

2. The moving body position determination device according to claim 1, wherein
   the at least one processor is configured to
      identify, based on a plurality of images, including the image, for which each imaging timing differs, the at least two light-emitting devices that emit in different emission patterns.

3. The moving body position determination device according to claim 1, wherein
   the at least one processor is configured to
      acquire a plurality of three-dimensional direction vectors that have a focal point of the imaging device as a starting point and the coordinate positions in the image of the at least two light-emitting devices as ending points, and attitude data expressing a direction that the imaging device is facing, and
      acquire, based on the acquired plurality of three-dimensional direction vectors and a height difference in the three-dimensional space between the at least two light-emitting devices, various distances in the three-dimensional space from the imaging device to the at least two light-emitting devices and an optical axis orientation that the imaging device faces.

4. The moving body position determination device according to claim 3, wherein
   the at least one processor is configured to
      adjust a longer distance of the acquired various distances.

5. The moving body position determination device according to claim 3, wherein
   the at least one processor is configured to
      adjust the various distances in accordance with a ratio of an amount of deviation between the coordinate positions in the three-dimensional space calculated based on the plurality of three-dimensional direction vectors and the acquired various distances.

6. The moving body position determination device according to claim 1, wherein
   the at least one processor is configured to
      control such that a coordinate position of a light-emitting device that exists in an outer edge of the image is not used to determine the coordinate position of the moving body.

7. The moving body position determination device according to claim 1, wherein
   the at least one processor is configured to
      when an image, acquired after acquiring a first image expressing an image that includes a first light-emitting device and another light-emitting device, is a second image that includes only the first light-emitting device and does not include the other light-emitting device, determine the coordinate position of the moving body based on a movement vector of the moving body to be calculated.

8. The moving body position determination device according to claim 1, wherein
   the at least one processor is configured to
      determine the coordinate position of the moving body in accordance with images acquired from a plurality of the imaging device attached to the moving body.

9. A moving body position determination device, comprising:
   a communicator; and
   at least one processor, wherein the at least one processor is configured to
      acquire a first image via the communicator, the first image expressing an image including a first light-emitting device and another light-emitting device of a plurality of light-emitting devices for which coordinate positions in three-dimensional space are known, the plurality of light-emitting devices including two light-emitting devices placed at desired positions in the three-dimensional space, the image being imaged by an imaging device attached to a moving body,
      determine, based on the acquired first image, at least one of a coordinate position of the moving body and an orientation the moving body is facing in the three-dimensional space,
      calculate, based on a second image acquired after acquiring the first image, a movement vector of the moving body, and
      when the second image only includes the first light-emitting device and does not include any other light-emitting devices, determine the coordinate position of the moving body based on the calculated movement vector.

10. A moving body position determination method of a moving body position determination device, the method comprising:
   acquiring an image via a communicator, the image including at least two light-emitting devices of a plurality of light-emitting devices for which coordinate positions in three-dimensional space are known, the plurality of light-emitting devices including two light-emitting devices placed at desired positions at which heights in the three-dimensional space differ, the at least two light emitting devices being imaged by an imaging device attached to a moving body;
   acquiring, based on the acquired image, coordinate positions in the image of the at least two light-emitting devices; and
   determining, based on the coordinate positions in the three-dimensional space and the coordinate positions in the image, at least one of a coordinate position of the moving body and an orientation the moving body is facing in the three-dimensional space.

11. The moving body position determination method according to claim 10, wherein
the at least one processor is configured to
identify, based on a plurality of images, including the image, for which each imaging timing differs, the at least two light-emitting devices that emit in different emission patterns.

12. The moving body position determination method according to claim 10, wherein
the at least one processor is configured to
acquire a plurality of three-dimensional direction vectors that have a focal point of the imaging device as a starting point and the coordinate positions in the image of the at least two light-emitting devices as ending points, and attitude data expressing a direction that the imaging device is facing, and
acquire, based on the acquired plurality of three-dimensional direction vectors and a height difference in the three-dimensional space between the at least two light-emitting devices, various distances in the three-dimensional space from the imaging device to the at least two light-emitting devices and an optical axis orientation that the imaging device faces.

13. The moving body position determination method according to claim 12, wherein
the at least one processor is configured to
adjust a longer distance of the acquired various distances.

14. The moving body position determination method according to claim 12, wherein
the at least one processor is configured to
adjust the various distances in accordance with a ratio of an amount of deviation between the coordinate positions in the three-dimensional space calculated based on the plurality of three-dimensional direction vectors and the acquired various distances.

15. The moving body position determination method according to claim 10, wherein
the at least one processor is configured to
control such that a coordinate position of a light-emitting device that exists in an outer edge of the image is not used to determine the coordinate position of the moving body.

16. The moving body position determination method according to claim 10, wherein
the at least one processor is configured to
when an image, acquired after acquiring a first image expressing an image that includes a first light-emitting device and another light-emitting device, is a second image that includes only the first light-emitting device and does not include the other light-emitting device, determine the coordinate position of the moving body based on a movement vector of the moving body to be calculated.

17. The moving body position determination method according to claim 10, wherein
the at least one processor is configured to
determine the coordinate position of the moving body in accordance with images acquired from a plurality of the imaging device attached to the moving body.

18. A moving body position determination system, comprising:
two light-emitting devices placed at desired positions for which heights in the three-dimensional space differ;
a moving body to which an imaging device is attached; and
a moving body position determination device, wherein
the moving body position determination device includes
a communicator, and
at least one processor, the at least one processor being configured to
acquire an image via the communicator, the image including at least two light-emitting devices of a plurality of light-emitting devices for which coordinate positions in three-dimensional space are known, the plurality of light-emitting devices including the two light-emitting devices, the image being imaged by the imaging device,
acquire, based on the acquired image, coordinate positions in the image of the at least two light-emitting devices, and
determine, based on the coordinate positions in the three-dimensional space and the coordinate positions in the image, at least one of a coordinate position of the moving body and an orientation the moving body is facing in the three-dimensional space.

* * * * *